C. E. BOST.
BEE-HIVE.
No. 176,273. Patented April 18, 1876.
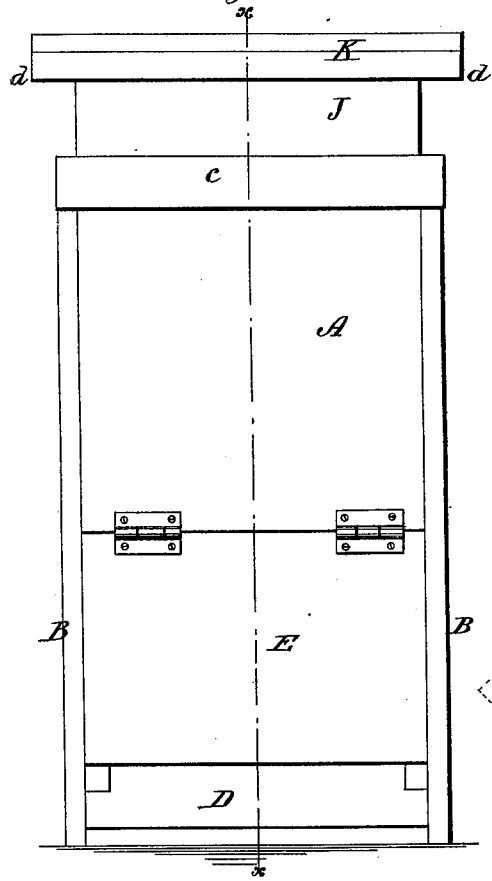
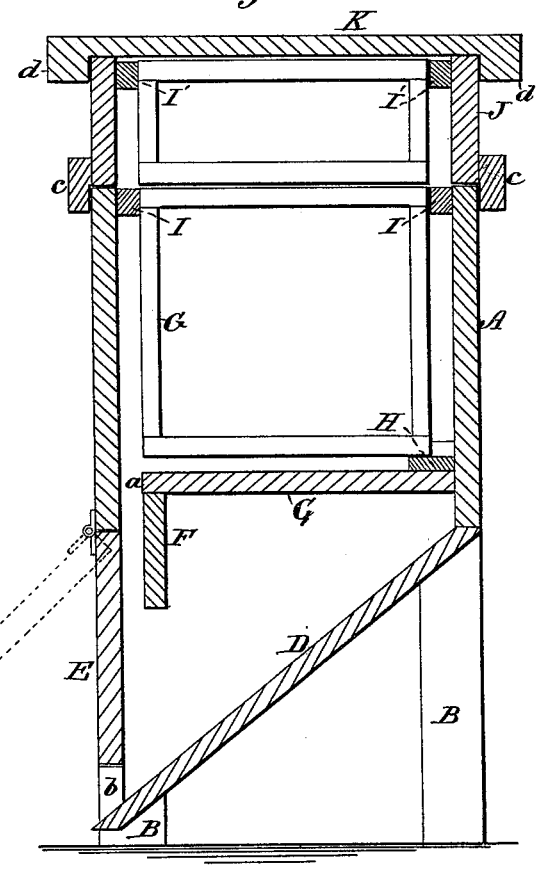
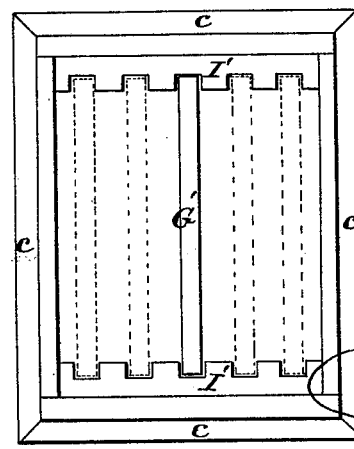
WITNESSES:
W. W. Hollingsworth
John C. Kenon
INVENTOR:
C. E. Bost
BY
ATTORNEYS.

UNITED STATES PATENT OFFICE.

CALEB E. BOST, OF DAVIDSON COLLEGE, NORTH CAROLINA.

IMPROVEMENT IN BEE-HIVES.

Specification forming part of Letters Patent No. 176,273, dated April 18, 1876; application filed February 8, 1876.

*To all whom it may concern:*

Be it known that I, CALEB E. BOST, of Davidson College, in the county of Mecklenburg and State of North Carolina, have invented a new and Improved Bee-Hive; and I do hereby declare that the following is a full, clear, and exact description of the same, reference being had to the accompanying drawing, forming a part of this specification, in which—

Figure 1 is a front elevation; Fig. 2, a vertical section through line $x$ $x$; Fig. 3, a plan view with the cover removed.

My invention relates to an improved construction of bee-hives, designed to give greater security to the bees from the attacks of moths and millers, and which shall be more convenient in handling, and better adapted to promote the health and prosperity of the bees in all seasons. It consists in the construction and arrangement of the entrance to the hive for keeping out moths and millers, and in a supplemental upper section for the hive, which can be taken off or placed on, as and for the purpose hereinafter described.

In the drawing, A represents the body of the hive, supported upon legs B, which extend over and cover the seams formed near the corners of the hive. C is the bottom of the hive, which extends horizontally across the same, leaving a space, $a$, for the bees to enter. The body of the hive is extended upon one side below the bottom C, and an inclined board, D, is placed thereunder for the bees to light upon, which, with the door E in front, constitutes a triangular chamber, forming a moth and miller trap. The door E extends nearly to the inclined board D, leaving a sufficient space, $b$, for the entrance of the bees. The said door is hinged at the top to the body of the hive, and may be lifted to give admission to the bee-keeper's hand into the moth and miller trap. F is a downwardly-projecting board, which both supports one end of the bottom of the hive, and at the same time operates as a screen to the entrance $a$, to more effectually exclude troublesome foreign insects. G are the honey-frames, which are made about twelve to twelve and one-half inches deep, and supported and held in place by the notched bar H and guides I, with about half an inch space all around. J is the supplemental section of the hive, which is of the same transverse dimensions as the hive itself, and is provided with guideways I' for its smaller set of honey-frames G', which are about eight inches deep. Said supplemental section is provided upon all four sides with boards $c$, extending over its lower edge, which fit over the top of the hive proper to form a secure lap-joint for the two parts, the legs B being cut away at the top to accommodate said joint. K is the cover of the hive, which is made with a rim, $d$, that exactly fits either the upper end of hive A or the upper end of the section J.

The advantages of this construction are in the arrangement of the hives for winter-quarters.

At the end of the honey-season, which will be about the time killing frosts appear, I remove the surplus honey, and lift off the cover and the supplemental section, and fit the cover upon the lower section or the hive proper.

This arrangement prevents freezing out or dying from cold while in winter-quarters, because, unlike most hives, there is no empty space above to admit of the natural heat of the bees passing off above, thus leaving the colony to perish with cold.

Among its other advantages, also, may be mentioned its superior cleanliness, and its facilities for ventilation, the frames only touching the hive at its corners.

In arranging the frames in the hive the bee-keeper can use his discretion as to the number of frames to be used, always employing, however, an odd number, as in that arrangement young queens only appear in the single central comb.

Having thus described my invention, what I claim as new is—

1. The detachable supplemental section J of the same transverse dimensions of the hive, and having a lap joint to connect therewith, in combination with the hive A and the cover K, provided with rim $d$, and adapted to fit either upon and form the top of the supplemental section J or the hive proper, as described.

2. The hive A, having extended sides, and a horizontal bottom, C, with opening $a$, in combination with the pendent projection F, and the inclined lighting-board D, substantially as and for the purpose described.

CALEB E. BOST.

Witnesses:
JOHN N. THOMPSON,
WALLACE A. BLACK.